United States Patent
Gordon et al.

(10) Patent No.: US 10,397,199 B2
(45) Date of Patent: Aug. 27, 2019

(54) INTEGRATED CONSENT SYSTEM

(71) Applicant: Microsoft Technology Licensing, LLC, Redmond, WA (US)

(72) Inventors: Ariel Gordon, Kirkland, WA (US); Benjamin Richard Vincent, Kirkland, WA (US); Stuart Lup-Sing Kwan, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 266 days.

(21) Appl. No.: 15/375,034

(22) Filed: Dec. 9, 2016

(65) Prior Publication Data

US 2018/0167371 A1 Jun. 14, 2018

(51) Int. Cl.
*H04L 29/06* (2006.01)
*G06F 21/41* (2013.01)
*G06Q 40/02* (2012.01)

(52) U.S. Cl.
CPC ............. *H04L 63/06* (2013.01); *G06F 21/41* (2013.01); *G06Q 40/02* (2013.01); *H04L 63/083* (2013.01); *H04L 63/0815* (2013.01)

(58) Field of Classification Search
CPC .... H04L 63/0815; H04L 63/083; G06F 21/41
See application file for complete search history.

(56) References Cited

U.S. PATENT DOCUMENTS

| 7,155,739 | B2 | 12/2006 | Bari et al. |
| 8,719,366 | B2 | 5/2014 | Mathew et al. |

(Continued)

FOREIGN PATENT DOCUMENTS

| WO | 03049000 A1 | 6/2003 |
| WO | 2016055868 A1 | 4/2016 |

OTHER PUBLICATIONS

Baldwin, et al., "Integrating applications with Azure Active Directory," https://azure.microsoft.com/en-us/documentation/articles/active-directory-integrating-applications/, Published on: Jul. 25, 2016, 17 pages.

(Continued)

*Primary Examiner* — Nelson Giddins
(74) *Attorney, Agent, or Firm* — Mannava & Kang, P.C.

(57) ABSTRACT

A system for creating an account with an identity provider. The system receives a request to create an identity provider account with the identity provider for use in logging onto a third-party system. The system generates one or more display pages for providing an integrated-consent user experience. The integrated-consent user experience includes a display page for collecting both new-account information and scope-of-consent information whereby a user consents to share information with the third-party system. After the user provides the new-account information that includes user credentials for the identity provider account and consents to share account information of the identity provider account with the third-party system, the system creates the identity provider account for the user. When the user subsequently signs in to the third-party system using the user credentials for the identity provider account, the third-party system accesses account information of the identity provider account based on the scope-of-consent information.

20 Claims, 5 Drawing Sheets

(56) References Cited

U.S. PATENT DOCUMENTS

| | | | |
|---|---|---|---|
| 9,043,870 B1 | 5/2015 | Barenholz et al. | |
| 9,336,500 B2 | 5/2016 | Lawson et al. | |
| 2003/0149781 A1* | 8/2003 | Yared | G06F 21/41 |
| | | | 709/229 |
| 2006/0236382 A1* | 10/2006 | Hinton | G06F 21/41 |
| | | | 726/8 |
| 2007/0101145 A1* | 5/2007 | Sachdeva | H04L 63/0815 |
| | | | 713/176 |
| 2010/0071046 A1 | 3/2010 | Seethana et al. | |
| 2012/0290445 A1* | 11/2012 | Wilson | G06Q 10/06312 |
| | | | 705/27.1 |
| 2012/0311663 A1* | 12/2012 | Seidl | G06F 21/41 |
| | | | 726/1 |
| 2013/0086657 A1* | 4/2013 | Srinivasan | H04L 63/10 |
| | | | 726/6 |
| 2013/0198823 A1* | 8/2013 | Hitchcock | G06F 21/41 |
| | | | 726/6 |
| 2013/0247142 A1* | 9/2013 | Nishizawa | G06F 21/604 |
| | | | 726/1 |
| 2014/0114703 A1* | 4/2014 | Cashman | G06Q 40/08 |
| | | | 705/4 |
| 2015/0026773 A1* | 1/2015 | Dunphey | H04L 63/10 |
| | | | 726/4 |
| 2015/0121462 A1* | 4/2015 | Courage | H04L 63/08 |
| | | | 726/4 |
| 2015/0200971 A1* | 7/2015 | Nishizawa | G06F 21/604 |
| | | | 726/1 |
| 2015/0341368 A1* | 11/2015 | Roth | G06F 21/00 |
| | | | 726/4 |
| 2016/0063239 A1* | 3/2016 | Chen | G06F 21/45 |
| | | | 726/6 |
| 2017/0006008 A1* | 1/2017 | Moran | H04L 63/08 |

OTHER PUBLICATIONS

"Social Login Setups—The Good, the Bad and the Ugly", Retrieved From: <<https://blog.cloudrail.com/social-login-setups-good-bad-ugly/>>, Aug. 2, 2016, 5 pages.

"International Search Report and Written Opinion Issued in PCT Application No. PCT/US2017/064790", dated Jan. 29, 2018, 12 pages.

* cited by examiner

INTEGRATED CONSENT SYSTEM

BACKGROUND

Many web services allow or require users to create accounts with them. For example, a customer of a bank is required to create an online account with the bank to access their bank account information via their web site or their application ("app"). As another example, a news service may allow users to access its news web site or app without creating an account. However, if a user wants to customize the experience with the news web site or app, the user may be allowed to create an account with the news service. When an account is created for a service provider, user credentials are established for accessing the account. The user credentials typically include a user name and password. The service provider may store the user credentials in association with the new account in an account store. To access (e.g., log on to) the account, the user subsequently provides the user credentials to the web site or the application. The service provider, using a process referred to as authentication, checks the account store to ensure that the user credentials are associated with an account. If so, the user is authenticated and allowed to access the account.

The managing of user credentials service provider can place a considerable burden on the service provider. A service provider would need to acquire (e.g., develop or purchase) a software system to manage its user credentials. Both the initial acquisition costs and ongoing maintenance of the software system can be expensive. In addition, the service provider would need to employ sophisticated security techniques to ensure the security of the user credentials, which can also be expensive. If the user credentials of a user are stolen, the thief not only can access the user's account with the service provider's own web site or application, but also may be able to access the user's account with other services. The ability to access the accounts with other services is due, in large part, to users have a tendency to use the same username and password for different web sites and applications, so they only need to remember one set of credentials.

To help relieve the burden on web services to manage user credentials, some web services, referred to as identity providers, manage user credentials on behalf of other web services, referred to as third-party systems. To create a third-party account, the user would need to have an identity provider account with the identity provider with associated user credentials. When a user attempts to create a third-party account, the third-party system directs the user to the identity provider. The identity provider collects the user credentials from the user and checks whether the user credentials are associated with an identity provider account. If they are, the identity provider provides to the third-party system evidence (e.g., a certificate or token signed by a private key of the identity provider) that the user has been authenticated. The third-party system then creates a third-party account and associates it with, for example, the user name used to access the identity provider account. When a user wants to access their third-party account, the third-party system directs the user to the identity provider for authenticating the user based on the user credentials. When the user is authenticated, the identity provider provides to the third-party system evidence that the user has been authenticated. The third-party system then allows the user to access their third-party account. Because the third-party system does not need to store complete user credentials, the third-party system can avoid the expense and risk of managing user credentials. Moreover, since an identity provider provides a specialized service, it may be able to expend considerable resources (i.e., much more than would be feasible for a single service provider) on ensuring the security of user credentials.

Various online service providers, such as social networks and electronic mail providers, also provide identity services to other web services. For example, an email provider may also operate as an identity provider for various electronic commerce web sites. Such identity providers may maintain considerable information about and on behalf of their users. This information can include demographic information, user communications, user-supplied data (e.g., photographs and documents), interaction history, and so on. A user's experience with a third-party system may be improved if the third-party system has access to the information of the user that the identity provider maintains. For example, by accessing demographic information, a news service may be able to present news stories that may be more relevant to the user. As an example, knowledge of the age of the user may be useful in deciding how to position an article about retirement on a display page (e.g., web page).

Because of privacy concerns, an identity provider typically requires a user to consent to the sharing of the information associated with the user's account with a third-party system. The identity provider may also allow the user to specify the scope of the consent by identifying what type of information can be shared with the third-party system. For example, a user may consent (or give permission) to share their demographic information and communications, but not their pictures. The scope of consent that a user designates may be different for different web services. For example, a user may consent to share pictures with a photo-processing web service, but not with a banking web service. When a user goes directly to an identity provider and creates an account, the identity provider would typically not have any reason to obtain consent to share information with any third-party system. Thus, the account-creation user experience, when creating the identity provider account, would not request a scope of consent. However, when a user is directed to an identity provider by a third-party system, the scope of consent for that third-party system would need to be requested. In such a case, the identity provider provides an account-creation user experience (i.e., the same as used when not directed by a third-party system) and then provides a scope-of-consent user experience. Identity providers desire to provide a user experience that both makes the creating of an identity provider account as simple and as fast as possible for the user and minimizes the computational resources (e.g., network traffic) needed to create an account.

SUMMARY

A method and system are provided for creating an account with an identity provider using an integrated-consent user experience that integrates an account-creation user experience and a scope-of-consent user experience. An integrated consent system receives a request to create an identity provider account with the identity provider for use in logging onto a third-party system. The integrated consent system generates one or more display pages for providing the integrated-consent user experience. The integrated-consent user experience includes a display page for collecting both some new-account information and scope-of-consent information whereby the user consents to share information with the third-party system. After the user provides the new-account information that includes user credentials for the identity provider account and consents to share account information of the identity provider account with the third-party system, the system creates the identity provider account for the user. When the user subsequently signs in to the third-party system using the user credentials for the identity provider account, the third-party system accesses account information of the identity provider account based on the scope-of-consent information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system are provided for integrating an account-creation user experience with a scope-of-consent user experience. In some embodiments, an integrated consent system provides an integrated user experience to establish user credentials for a user for use by an identity provider in authenticating a user on behalf of a third-party system and to obtain a scope of consent for the third-party system to access information of the identity provider relating to the user. The integrated consent system receives a request to establish user credentials (e.g., create an account) for the user so that the identity provider can authenticate the user on behalf of the third-party system based on the user credentials. For example, the user using a smartphone (or other user device) may have accessed a web page of the third-party system and requested to create a third-party account using user credentials associated with an identity provider account. If the user has not established user credentials with an identity provider account, the third-party system may have provided to the user a web page so that the user can select an identity provider with which the third-party system has an established relationship. When the user selects such an identity provider, a request to establish user credentials may be sent from the user device to the identity provider.

After the request is received by the identity provider, the integrated consent system generates an integrated display page for establishing the user credentials. The integrated display page allows for collecting information needed to establish the user credentials and a consent to share. For example, the display page may request the user to enter a user name and password and to select from a list of types of information (e.g., profile information) that the user consents to share with the third party. The integrated consent system then sends the display page to the user.

In response to sending the display page, the integrated consent system receives, based on the user interacting with the display page, information needed to establish the user credentials and a consent to share information associated with the user credentials with the third-party system. For example, the user enters a desired user name and password (i.e., the credentials), selects check boxes to indicate the scope of consent, and then selects a button to request the identity provider account to be created. Upon receiving the information from the user, the integrated consent system establishes user credentials by, for example, creating an identity provider account that is associated with the user name and password. The integrated consent system then notifies the third-party system that user credentials have been established for the user. The third-party system can then create a third-party account and rely on the identity provider to authenticate the user. By providing an integrated display page, the integrated consent system integrates an establish-credentials user experience (e.g., account-creation user experience) and a scope-of-consent user experience on an integrated display page to improve the overall user experience, improve the chances that a user who starts the account creation process actually completely the process, and reduce the computational resources (e.g., reducing network traffic) of the identity provider that are need to create an account.

Figure 1:
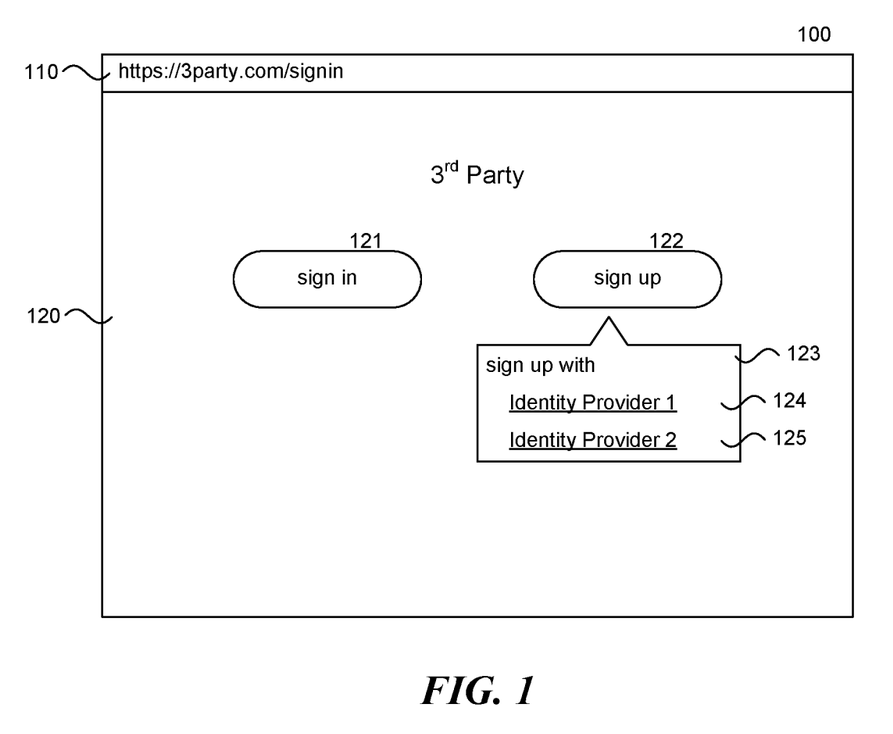
FIG. 1 illustrates a display page to initiate the creation of a third-party system account.
Figure 2:
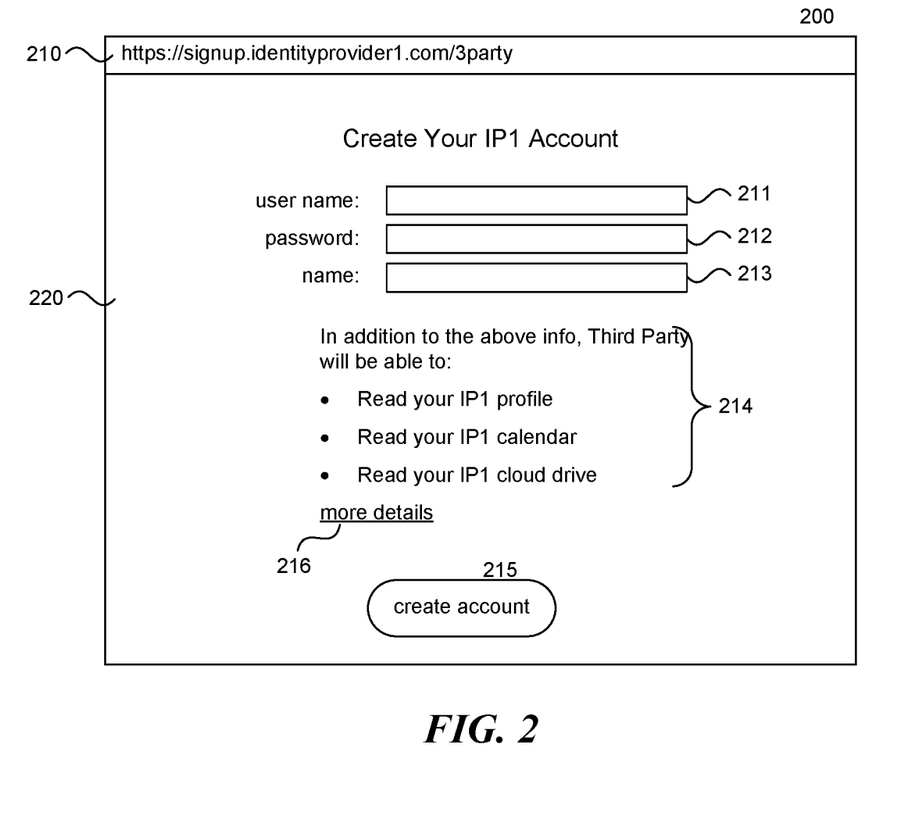
FIG. 2 illustrates a display page of an identity provider that provides an integrated user experience in some embodiments.

FIGS. 1 and 2 illustrate the creation of an identity provider account for use in authenticating with a third-party system in some embodiments. FIG. 1 illustrates a display page to initiate the creation of a third-party system account. A display page 100 includes a web address area 110 and a content area 120. The web address area contains a uniform resource locator or web address of a sign-in page of the third-party system. The content area contains a sign-in button 121 and a sign-up button 122. If the user has already established a third-party account, the user would select the sign-in button to sign in using the user's user credentials for the identity provider. If, however, the user has not established a third-party account, the user would select (e.g., hover the cursor over) the sign-up button. In response, a list 123 would be displayed containing a link 124 to a first identity provider and a link 125 to a second identity provider. When a user selects one of the links, the user is directed to a web page of the selected identity provider for creating an identity provider account.

FIG. 2 illustrates a display page of an identity provider that provides an integrated user experience in some embodiments. A display page 200 includes a web address area 210 and a content area 220. The web address area contains the uniform resource locator of a create account web page of the identity provider. The uniform resource locator may also identify the third-party system. The content area includes an account user name input area 211, an account password input area 212, a name input area 213, a scope-of-consent area 214, and a create account button 215. The account user name input area and the account password area allow the user to provide their selected user credentials. The name input area allows the user to provide their name. The name input area is an example of information that may be needed to create the identity provider account. Although not illustrated, the display page may also include input areas for the user to input other information needed to create the identity provider account, such as street address, electronic mail address, and so on. The scope-of-consent area outlines the scope of consent for the identity provider to share information of the user with the third-party system. In this example, the scope of consent indicates that profile information, calendar information, and information stored on a cloud drive of the identity provider are to be shared with the third-party system. A more details link 216 may allow the user to further customize the scope of consent by, for example, not agreeing to share information of the cloud drive. When the user selects the create account button, the identity provider creates an identity provider account for the user that is associated with the user credentials of the specified user name and password. The identity provider may then direct the user to a webpage of the third-party system to complete the creation of the third-party system account. The input areas 211-213 (e.g., for collecting new-account information) and the create account button may be part of the typical account-creation user experience, and the scope-of-consent area is included on the same web page to form the integrated-consent user experience. In this way, the identity provider provides an integrated web page for both collecting information needed to create an identity provider account and obtaining consent to share information with a third-party system.

In some embodiments, the account-creation user experience may itself involve the user interacting with multiple web pages. In such a case, the integrated-consent user experience may include the same number of web pages, but with at least one web page modified to support obtaining the scope of consent. Also, the scope-of-consent user experience may also include a prospective consent to share resources of the identity provider. For example, when the user creates an identity provider account, the user may not sign up to use cloud storage of the identity provider because of the cost. The scope-of-consent user experience, however, may allow the user to consent to share data stored on the cloud storage should the user later decide to sign up. In this way, the user is not burdened with having to deal with a second scope-of-consent user experience at a later time. In some embodiments, the integrated-consent user experience may provide to the user a list of types of information that can be shared and allow the user to select (e.g., by selecting or unselecting a checkbox) the types of information to be shared.

Figure 3:
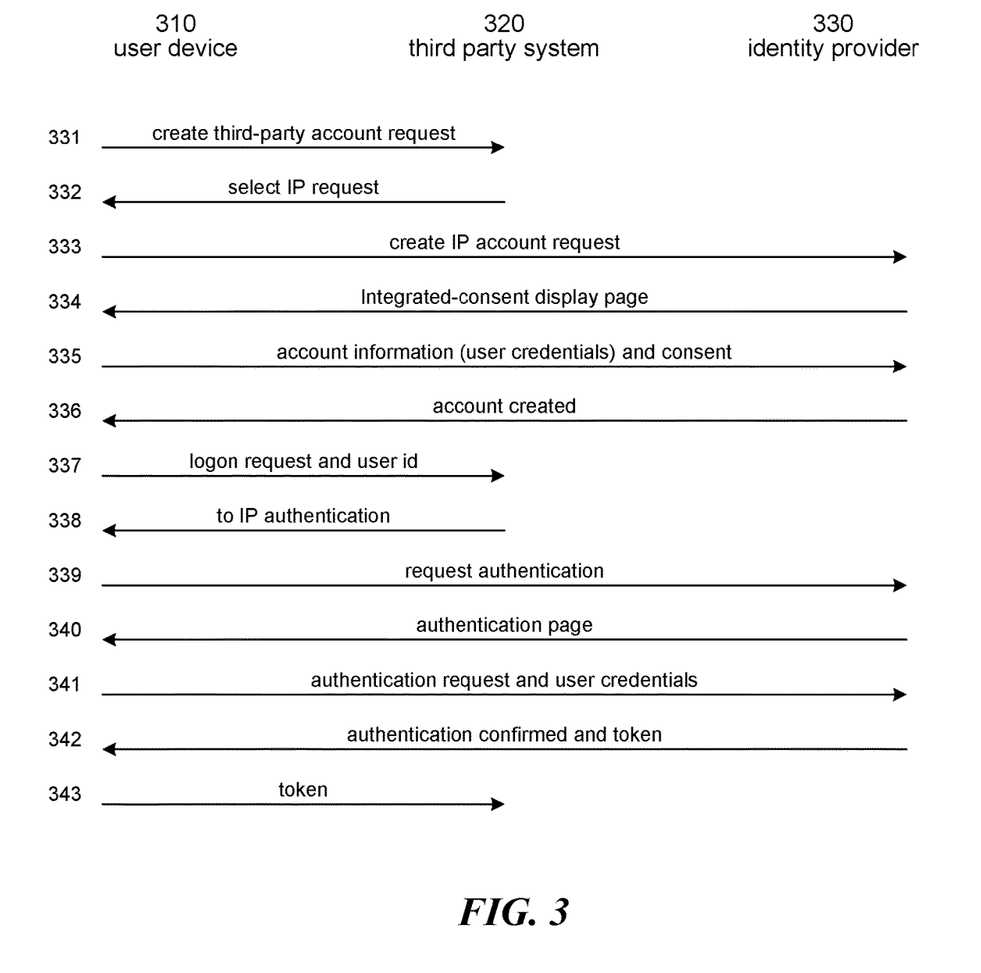
FIG. 3 is a communications diagram illustrating communications between a user and a third-party system and between the user and an identity provider to create accounts using an integrated-consent user experience in some embodiments.

FIG. 3 is a communications diagram illustrating communications between a user and a third-party system and between the user and an identity provider to create accounts using an integrated-consent user experience in some embodiments. A user using a user device 310 interacts with a third-party system 320 and an identity provider 330 to create a third-party account and an identity provider account. In response to the user requesting via a display page to create a third-party account, the user device sends 331 to the third-party system a request to create a third-party account. In response, the third-party system sends 332 a display page through which the user (e.g., assuming the user does not currently have an identity provider account) can select an identity provider to use in authenticating the user. In response to the user selecting an identity provider, the user device sends 333 to the identity provider a request to create an identity provider account. In response to receiving the request, the identity provider generates and sends 334 to the user device an integrated-consent display page. After the user fills out the account information and designates the scope of consent, the user device sends 335 to the identity provider the account information and scope of consent. The identity provider then creates the identity provider account and associates the user credentials with that identity provider account. The identity provider then sends 336 to the user device an indication that the identity provider account has been created. The indication may also direct the user device to return to the create account process of the third-party system. The user then completes the creation of the third-party account (not shown). Subsequently, when a user wants to sign in to the third-party account, the user provides their user name, and the user device sends 337 to the third-party system a request along with the user name. The third-party system then sends 338 to the user device an indication to access an authentication web page of the identity provider. The user device then sends 339 to the identity provider a request to authenticate the user. The identity provider responds 340 with an authentication web page. The user then provides their user credentials via the authentication web page, and the user device sends 341 to the identity provider an authentication request plus the user credentials. In some cases, an identity provider may employ a more secure authentication process using a multi-factor authentication, for example, by sending a single-use code to the user's smartphone, by requesting a biometric (e.g., fingerprint), and so on. After authenticating the user, the identity provider sends 342 to the user device an indication that the authentication has been confirmed along with a token as evidence of the authentication. The user device then sends 343 to the third-party system the token. After confirming (e.g., using a public key of the identity provider) that the token confirms the authentication of the user, the third-party system logs the user onto the third-party account. In some embodiments, the third-party system may interact directly with the identity provider system. For example, when the identity provider authenticates a user, the identity provider may provide evidence of authentication directly to the third-party system. The third-party system can then complete the creation of the third-party account.

Figure 4:
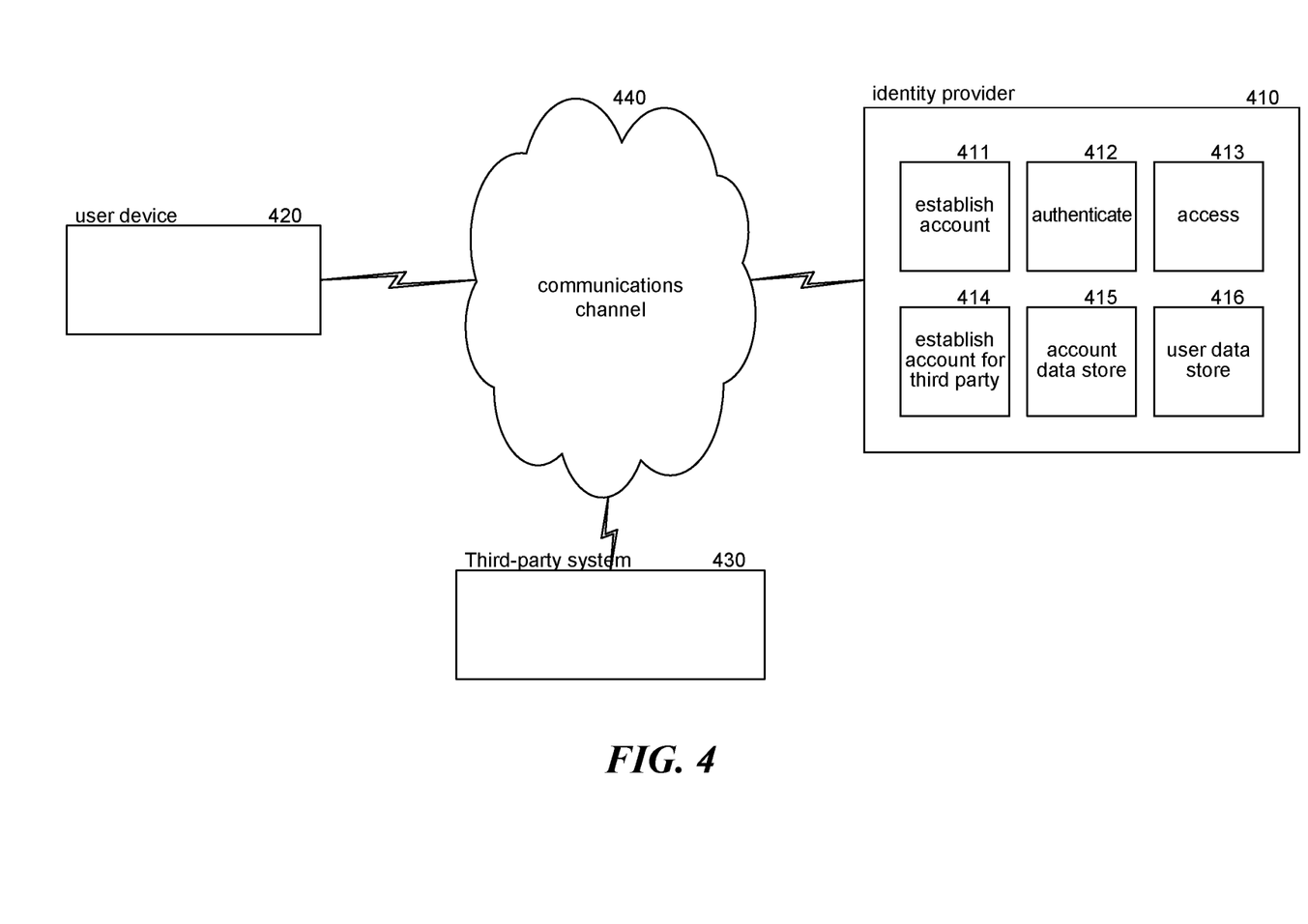
FIG. 4 is a block diagram illustrating components of an identity provider in some embodiments.

FIG. 4 is a block diagram illustrating components of an identity provider in some embodiments. A user device 420 is connected to an identity provider 410 and a third-party system 430 via a communications channel 440. The communications channel may be the Internet. The user device may be a smartphone, laptop, tablet, desktop, or other computing device. The third-party system is a computing system. The identity provider is a computing system and may include an establish account component 411, an authenticate component 412, an access component 413, an establish account for third party component 414, an account data store 415, and a user data store 416. The establish account component, the authenticate component, and the access component may be conventional components of an identity provider. The establish account component may be used to establish an account with the identity provider independently of any third-party system. The authenticate component may be used to authenticate a user given the user credentials. The access component may allow a third-party system access to information of the identity provider. The account data store stores (e.g., on a disk drive) account information of the identity provider accounts such as user credentials, user names, user addresses, user demographic information, and so on. The user data store stores user data such as pictures, communications, documents, and so on. The establish account for third party component controls the establishing of an identity provider account so that the user can use the user credentials to sign in to a third party system. The establish account for third party component provides an integrated-consent user experience so that a separate display page is not needed to collect only the scope of the consent.

The computing systems of an identity provider, a third-party system, and a user device may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the integrated consent system. The data transmission media are used for transmitting data via transitory, propagating signals or carrier waves (e.g., electromagnetism) via a wired or wireless connection.

The integrated consent system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the integrated consent system may be implemented in hardware using, for example, an application-specific integrated circuit (ASIC).

Figure 5:
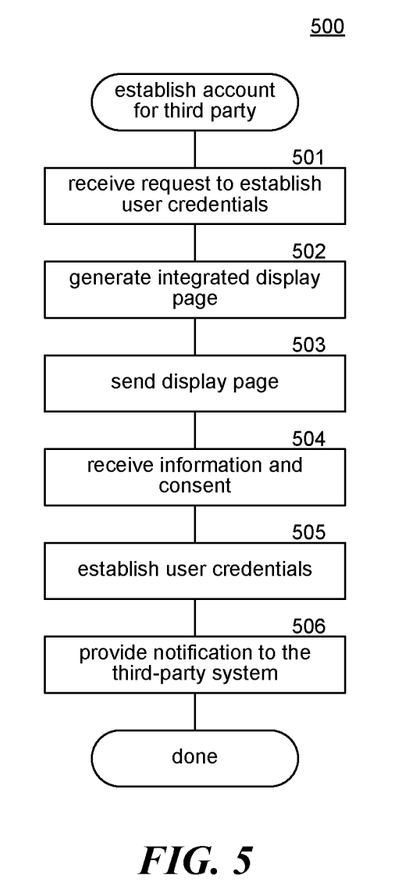
FIG. 5 is a flow diagram that illustrates the processing of an establish account for third party component in some embodiments of the integrated consent system.

FIG. 5 is a flow diagram that illustrates the processing of an establish account for third party component in some embodiments of the integrated consent system. An establish account for third party component 500 coordinates the establishing of user credentials by an identity provider for use in authenticating a user to access a third-party system. In block 501, the component receives a request to establish user credentials for a user to sign in to a third-party system. In block 502, the component generates an integrated display page to both collect information needed to create an identity provider account and collect a scope of consent. In block 503, the component sends the integrated display page to a user device. In block 504, the component receives the information needed to create the identity provider account along with the scope of consent. In block 505, the component establishes the user credentials, records an indication of the scope of consent, and associates them with a newly created identity provider account. In block 506, the component sends a notification that the user credentials have been established to the third-party system either through the user device or directly to the third-party system. The component then completes.

The following paragraphs describe various embodiments of aspects of the integrated consent system. An implementation of the integrated consent system may employ any combination of the embodiments. The processing described below may be performed by a computing device with a processor that executes computer-executable instructions stored on a computer-readable storage medium that implements the integrated consent system.

In some embodiments, a method performed by a computing system for creating an account for a user with an identity provider is provided. The method comprising receives a request to create an identity provider account with the identity provider for use in logging onto a third-party system. The method generates one or more display pages for providing an integrated-consent user experience that includes at least one of the one or more display pages for collecting both some new-account information and scope-of-consent information for consenting to share account information with the third-party system. The method, after the user provides the new-account information that includes user credentials for the identity provider account and a scope of consent to share account information of the identity provider account with the third-party system, creates for the user the identity provider account and records an indication of the scope of consent. When the user subsequently signs in to the third-party system using the user credentials for the identity provider account, the third-party system accesses account information of the identity provider account based on the user having provided the scope of consent. In some embodiments, the request is received from a device of the user based on the user selecting a create account indicator on a display page for creating an identity provider account provided by the third-party system. In some embodiments, a display page for collecting both some new-account information and scope-of-consent information of the identity provider includes a selectable indicator to indicate that some new-account information has been provided and to indicate the scope of consent. In some embodiments, the scope of consent includes a prospective consent to share account information that has not yet been created. In some embodiments, the method, after creating the identity provider account, directs a display page of the third-party system to be displayed on a device of the user wherein the third-party system creates a third-party account for the user based on the user credentials of the identity provider account. In some embodiments, the directing of the display page to be displayed includes providing account information of the identity provider account to the third-party system. In some embodiments, the third-party system maintains a third-party account for the user that is accessible using the user credentials of the identity provider account.

In some embodiments, a computing system for creating an identity provider account with an identity provider is provided. The computing system comprises a computer-readable storage medium storing computer-executable instructions a processor adapted to execute the computer-executable instructions stored in the computer-readable storage medium. The instructions for controlling the computing system to receive an indication that a user has requested to create a third-party account with a third-party system using credentials of an identity provider account of the identity provider, wherein the identity provider account has not yet been created. The instructions for controlling the computing system to generate a display page for both collecting new-account information for the identity provider account and collecting scope-of-consent information of the identity provider account with the third-party system to avoid generating a separate display page for collecting only the scope-of-consent information. The instructions for controlling the computing system to send to a device of the user the display page. The instructions for controlling the computing system to receive from the device of the user the new-account information and the scope-of-consent information input via the display page. The new-account information includes user credentials needed to create the identity provider account. The instructions for controlling the computing system to create for the user the identity provider account and record an indication of the scope-of-consent information. The instructions for controlling the computing system to provide notification to the third-party system that the identity provider account has been created. In some embodiments, the third-party system, upon receiving the notification, creates the third-party account that is signed in to using the user credentials of the identity provider account. In some embodiments, the notification includes some new-account information. In some embodiments, multiple display pages are generated to collect new-account information. In some embodiments, the scope-of-consent information includes a prospective consent to share account information of a resource that the user has not yet signed up for. In some embodiments, the display page lists types of information that is to be shared with the third-party system. In some embodiments, the indication is received from a device of the user based on the user selecting a create account indicator on a display page provided by the third-party system. In some embodiments, the display page includes a selectable indicator to indicate that the new-account information and the scope-of-consent information are to be provided by the user.

In some embodiments, a computer-readable storage medium storing computer-executable instructions for controlling a computing system to establish user credentials with an identity provider is provided. The instructions for controlling the computing system to receive a request to establish user credentials for a user so that the identity provider can authenticate the user on behalf of a third-party system. The instructions for controlling the computing system to generate an integrated display page for establishing the user credentials. The integrated display page is for both collecting information needed to establish the user credentials and collecting scope-of-consent information for sharing information associated with the user credentials with the third-party system. The instructions for controlling the computing system to send the integrated display page and receive, based on the user interacting with the integrated display page, information. The instructions for controlling the computing system to after receiving the information needed to establish the user credentials and the scope-of-consent information, establish the user credentials. The instructions for controlling the computing system to provide notification to the third-party system that the user credentials have been established for the user. The scope-of-consent information associated with the user credentials is not provided on a display page that is only for acquiring the scope-of-consent information. In some embodiments, the user subsequently signs in to the third-party system using the user credentials, and the third-party system accesses information associated with the user credentials based on the scope-of-consent information. In some embodiments, the request is received based on the user selecting a create identity provider account indicator on a display page provided by the third-party system. In some embodiments, the integrated display page includes a selectable indicator to indicate that information needed to establish the user credentials and scope-of-consent information are being provided. In some embodiments, the scope-of-consent information includes a prospective consent to share information that has not yet been created.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for creating an account for a user with an identity provider, the method comprising:

receiving a request to create an identity provider account with the identity provider for use in logging onto a third-party system;

generating one or more display pages for providing an integrated-consent user experience that includes at least one of the one or more display pages for collecting both new-account information and scope-of-consent information for consenting to share account information with the third-party system;

receiving, from the user and through the one or more display pages, the new-account information that includes user credentials for the identity provider account and a scope of consent to share account information of the identity provider account with the third-party system;

based on receipt of the new-account information and a consent by the user to share account information as noted by the scope of consent, creating for the user, the identity provider account; and recording an indication of the scope of consent, wherein when the user subsequently signs in to the third-party system using the user credentials for the identity provider account, the third-party system accesses account information of the identity provider account based on the user having provided the scope of consent.

2. The method of claim 1 wherein the request is received from a device of the user based on the user selecting a create account indicator on a display page for creating an identity provider account provided by the third-party system.

3. The method of claim wherein a display page for collecting both new-account information and scope-of-consent information of the identity provider includes a selectable indicator to indicate that some new-account information has been provided and to indicate the scope of consent.

4. The method of claim 1 wherein the scope of consent includes a prospective consent to share account information that has not yet been created.

5. The method of claim 1 further comprising, after creating the identity provider account, directing a display page of the third-party system to be displayed on a device of the user wherein the third-party system creates a third-party account for the user based on the user credentials of the identity provider account.

6. The method of claim 5 wherein the directing of the display page to be displayed includes providing account information of the identity provider account to the third-party system.

7. The method of claim 1 wherein the third-party system maintains a third-party account for the user that is accessible using the user credentials of the identity provider account.

8. A computing system for creating an identity provider account with an identity provider, the computing system comprising:

a non-transitory computer-readable storage medium storing computer-executable instructions for controlling the computing system to:

receive an indication that a user has requested to create a third-party account with a third-party system using credentials of an identity provider account of the identity provider, wherein the identity provider account has not yet been created;

generate a display page for both collecting new-account information for the identity provider account and collecting scope-of-consent information of the identity provider account with the third-party system to avoid generating a separate display page for collecting only the scope-of-consent information;

send to a device of the user the display page;
receive from the device of the user the new-account information and the scope-of-consent information input via the display page, the new-account information including user credentials needed to create the identity provider account;
based on receipt of the new-account information and a consent by the user to share account information as noted by the scope of consent, create for the user, the identity provider account;
record an indication of the scope-of-consent information; and
provide notification to the third-party system that the identity provider account has been created; and
a hardware processor adapted to execute the computer-executable instructions stored in the non-transitory computer-readable storage medium.

9. The computing system of claim 8 wherein the third-party system, upon receiving the notification, creates the third-party account that is signed in to using the user credentials of the identity provider account.

10. The computer system of claim 9, wherein the notification includes new-account information.

11. The computer system of claim 8 wherein multiple display pages are generated to collect new-account information.

12. The computer system of claim 8 wherein the scope-of-consent information includes a prospective consent to share account information of a resource that the user has not yet signed up for.

13. The computer system of claim 8 wherein the display page lists types of information that is to be shared with the third-party system.

14. The computer system of claim 8 wherein the indication is received from a device of the user based on the user selecting a create account indicator on a display page provided by the third-party system.

15. The computer system of claim 8 wherein the display page includes a selectable indicator to indicate that the new-account information and the scope-of-consent information are to be provided by the user.

16. A non-transitory computer-readable storage medium storing computer-executable instructions for controlling a computing system to establish user credentials with an identity provider, the computer-readable storage medium storing computer-executable instructions to:
receive a request to establish user credentials for a user so that the identity provider can authenticate the user on behalf of a third-party system;
generate an integrated display page for establishing the user credentials, the integrated display page for both collecting information needed to establish the user credentials and collecting scope-of-consent information for sharing information associated with the user credentials with the third-party system;
send the integrated display page;
receive, based on the user interacting with the integrated display page, information;
based on receipt of the information needed to establish the user credentials and a consent by the user to share account information as noted by the scope-of-consent information, establish the user credentials; and
provide notification to the third-party system that the user credentials have been established for the user, wherein the scope-of-consent information associated with the user credentials is not provided on a display page that is only for acquiring the scope-of-consent information.

17. The computer-readable storage medium of claim 16, wherein when the user subsequently signs in to the third-party system using the user credentials, and the third-party system accesses information associated with the user credentials based on the scope-of-consent information.

18. The computer-readable storage medium of claim 16 wherein the request is received based on the user selecting a create identity provider account indicator on a display page provided by the third-party system.

19. The computer-readable storage medium of claim 16 wherein the integrated display page includes a selectable indicator to indicate that information needed to establish the user credentials and scope-of-consent information are being provided.

20. The computer-readable storage medium of claim 16 wherein the scope-of-consent information includes a prospective consent to share information that has not yet been created.

* * * * *